United States Patent
Ahn et al.

(10) Patent No.: US 9,316,768 B2
(45) Date of Patent: Apr. 19, 2016

(54) SUBSTRATE FOR PREVENTING BURR GENERATION

(71) Applicant: Point Engineering Co., Ltd., Asan-si, Chungcheongnam-do (KR)

(72) Inventors: Bum Mo Ahn, Yongin-si (KR); Ki Myung Nam, Cheonan-si (KR); Kyung Soo Yoo, Seoul (KR)

(73) Assignee: Point Engineering Co., Ltd., Asan-si (KR)

( * ) Notice: Subject to any disclaimer, the term of this patent is extended or adjusted under 35 U.S.C. 154(b) by 0 days.

(21) Appl. No.: 14/546,298

(22) Filed: Nov. 18, 2014

(65) Prior Publication Data
US 2015/0138659 A1 May 21, 2015

(30) Foreign Application Priority Data
Nov. 20, 2013 (KR) .................... 10-2013-0141255

(51) Int. Cl.
*G02B 5/08* (2006.01)
*B32B 3/26* (2006.01)

(52) U.S. Cl.
CPC . *G02B 5/085* (2013.01); *B32B 3/26* (2013.01); *B32B 3/263* (2013.01); *B32B 2307/202* (2013.01); *B32B 2307/206* (2013.01); *B32B 2551/00* (2013.01); *Y10T 428/24612* (2015.01)

(58) Field of Classification Search
CPC ..... G02B 5/085; B32B 3/263; B22B 2551/00
USPC ........................................ 359/871
See application file for complete search history.

(56) References Cited

U.S. PATENT DOCUMENTS

2008/0236870 A1* 10/2008 Kuwajima ............ H01C 1/148
174/126.2
2011/0116271 A1 5/2011 Ide et al. .................. 362/294

FOREIGN PATENT DOCUMENTS

JP 2011-003626 1/2011 ............ H01L 23/14
KR 10-2011-0055401 5/2011 ............ H01L 33/48

OTHER PUBLICATIONS

Korean Intellectual Property Office, Office Action—Notification of Grounds for Rejection regarding Korean Patent Application No. 10-2013-0141255, dated Dec. 2, 2014, 4 pages.

* cited by examiner

*Primary Examiner* — Euncha Cherry
(74) *Attorney, Agent, or Firm* — Sunstein Kann Murphy & Timbers LLP

(57) ABSTRACT

A substrate for an optical device includes an optical device substrate including a plurality of conductive plates elongated along a length direction, wherein side surfaces of the conductive plates are bonded to each other with insulators interposed therebetween, the insulators being respectively formed on the side surfaces. A groove having a predetermined depth for preventing burrs is formed in a lower surface of the optical device substrate at each point where a cutting line is crossed with one of the insulators when the optical device substrate is cut in a length direction and in a vertical direction, the groove being formed in such a way that said one of the insulators is exposed to an inside of the groove.

8 Claims, 13 Drawing Sheets

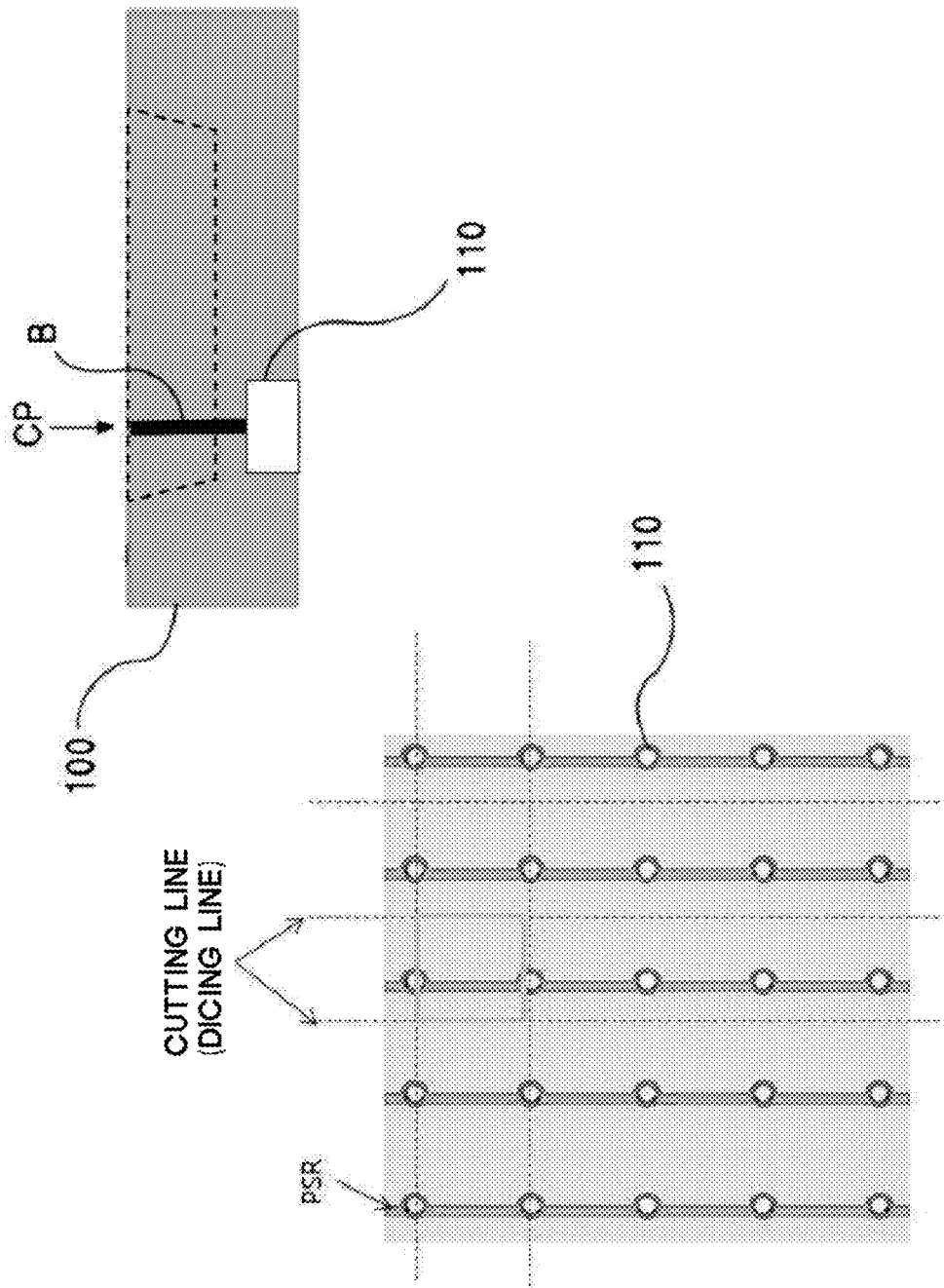

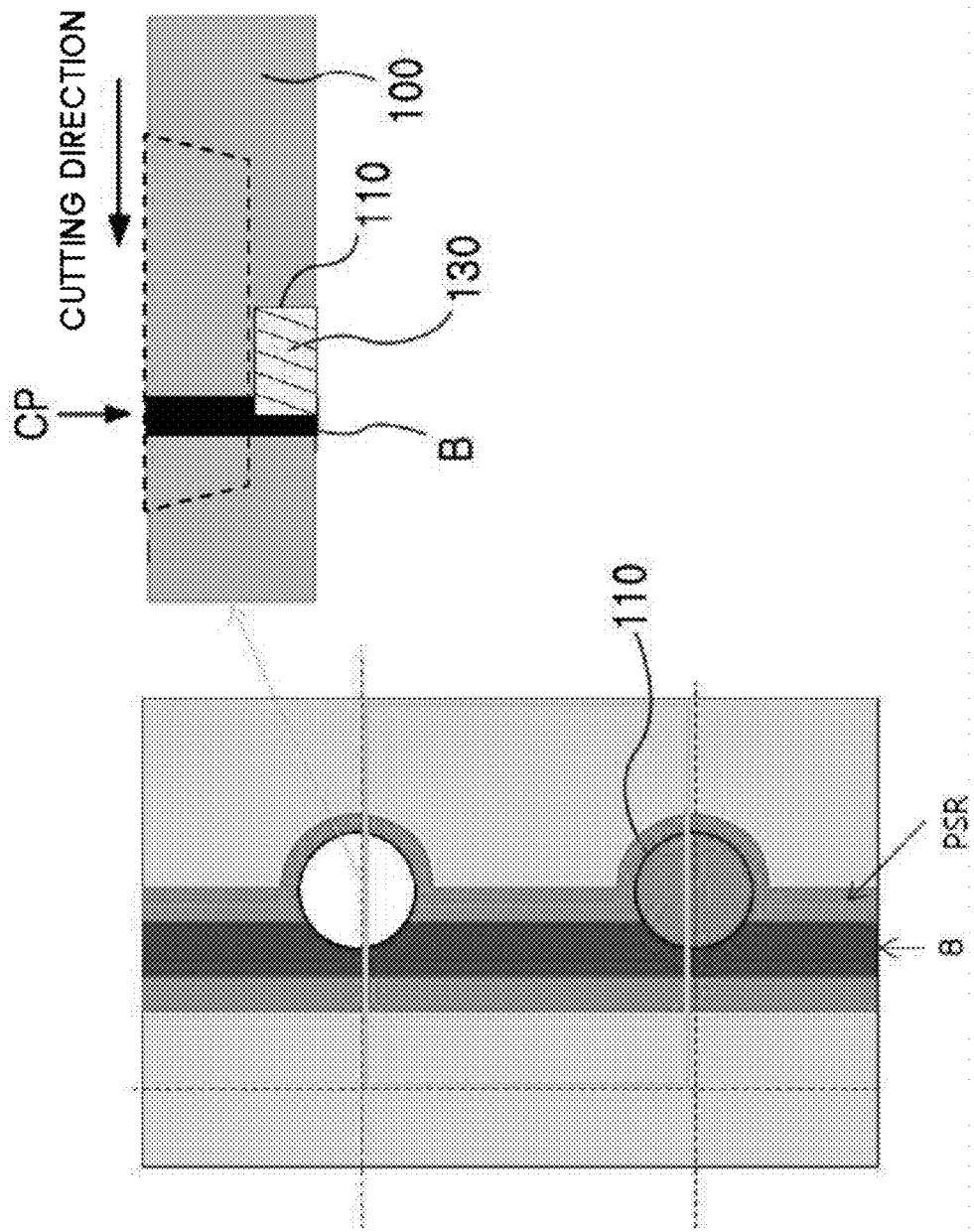

US 9,316,768 B2

SUBSTRATE FOR PREVENTING BURR GENERATION

BACKGROUND

Priority is claimed from Korean Patent Application No.10-2013-0141255, the full disclosure of which is hereby incorporated by reference herein.

1. Technical Field

The present invention relates to a substrate for an optical device, more particularly to a substrate for an optical device for preventing electrical shorts among the elements in the substrate due to the burrs generated during the substrate cutting process.

2. Description of the Related Art

LEDs are being used as the light source of a back light unit (BLU) for a liquid crystal display (LCD) which is used in the flat panel displays such as TVs, computer monitors, and the like.

An optical device chip such as an LED is being mounted on the substrate for an optical device, and the individual optical devices are manufactured through a separation process i.e. sawing or dicing of the substrate for the optical devices.

However, according to the conventional methods, when a substrate for an optical device made by alternately stacking conductive plates and insulating films (or insulating layers) is being sawed or diced, burrs are generated during the dicing process, and there has been a problem in that electrical shorts are being occurred since the burrs generated due to the difference in the material hardness between the conductive plate and the insulating film are penetrating into the conductive plate by crossing the insulating film along the direction of cutting.

SUMMARY

A substrate for an optical device is configured for preventing electrical shorts among the elements in the substrate occurring due to the burrs generated during the cutting process of the substrate for the optical device.

According to an aspect of the present invention, there is provided a substrate for an optical device including an optical device substrate including a plurality of conductive plates elongated along a length direction, wherein side surfaces of the conductive plates are bonded to each other with insulators interposed therebetween, the insulators being respectively formed on the side surfaces, wherein a groove having a predetermined depth for preventing burrs is formed in a lower surface of the optical device substrate at each point where a cutting line is crossed with one of the insulators when the optical device substrate is cut in a length direction and in a vertical direction, the groove being formed in such a way that said one of the insulators is exposed to an inside of the groove.

It is preferable that a liquid insulation material is deposited and cured inside the groove.

It is preferable that a photosensitive solder resist (PSR) is deposited on an area of the insulator exposed to the lower surface of the optical device substrate and on an area of the liquid insulating material exposed to the lower surface of the optical device substrate.

It is preferable that the groove is formed such that at least a part of the insulator exposed to the lower surface of the optical device substrate is accommodated inside the groove.

It is preferable that the groove has a larger diameter than a width of each insulator.

It is preferable that a solder resist is deposited on an upper surface and the lower surface of the optical device substrate so as to increase an optical reflectivity.

It is preferable that a cavity reaching downwardly to a predetermined depth from the upper surface of the optical device substrate is formed in the optical device substrate in such a way that the insulator is exposed to a bottom surface of the cavity.

It is preferable that the substrate for an optical device further includes an optical device chip mounted on the optical device substrate at an inside of the cavity.

BRIEF DESCRIPTION OF DRAWINGS

Objects, features and advantages of the present invention will become more apparent to those of ordinary skill in the art by describing in detail exemplary embodiments thereof with reference to the accompanying drawings, in which:

FIGS. 4a, 4b, 5, and 6 are the drawings for describing the location where a groove for preventing burrs is being formed in the substrate for an optical device according to an exemplary embodiment of the present invention.

DETAILED DESCRIPTION OF EMBODIMENTS

Figure 1A:
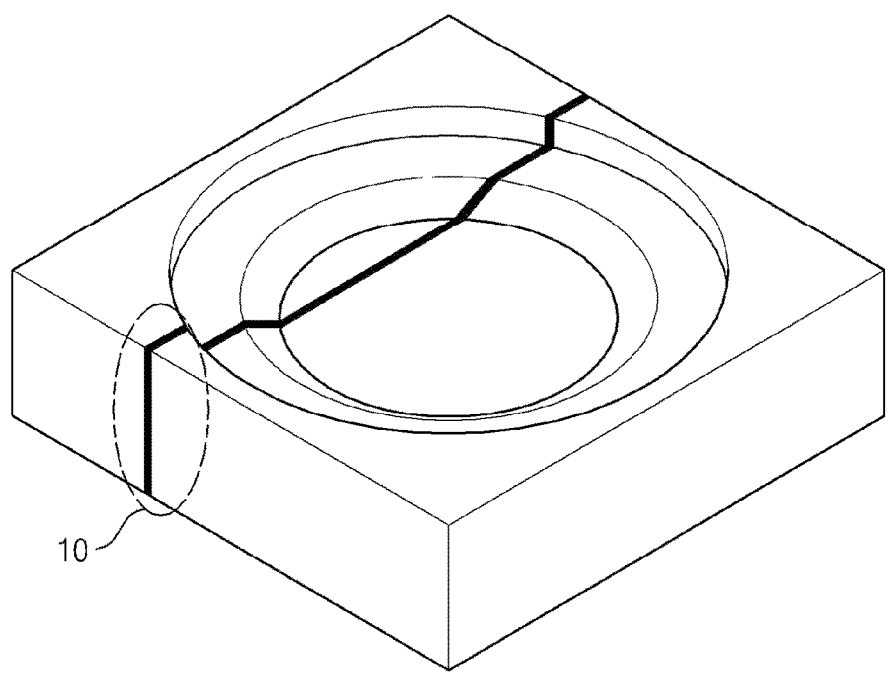
FIGS. 1a, 1b, 1c, and 1d are the exemplary drawings showing the problem of burr generation which is to be solved in the present invention.
Figure 1B:
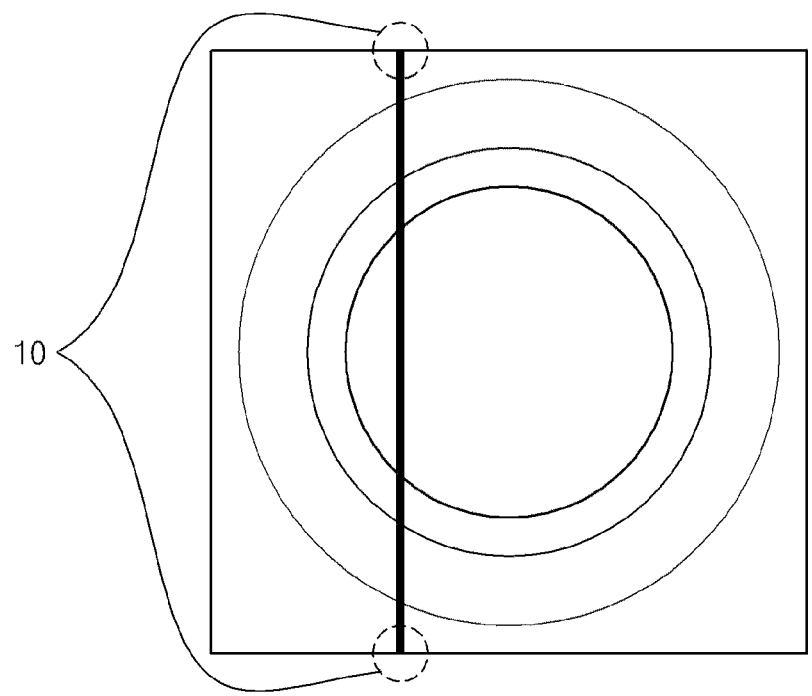
Figure 1C:
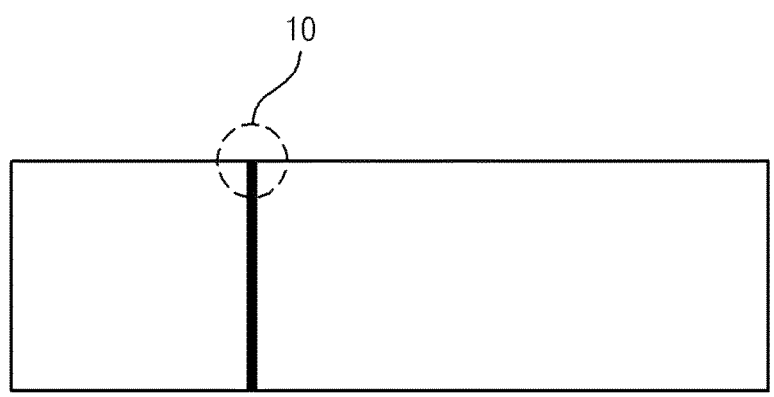

FIGS. 1a, 1b, and 1c are the exemplary drawings showing the problem of burr generation which is to be solved. FIG. 1a is a perspective view showing a chip substrate formed resulting from the cutting of a substrate for an optical device.

Figure 1D:
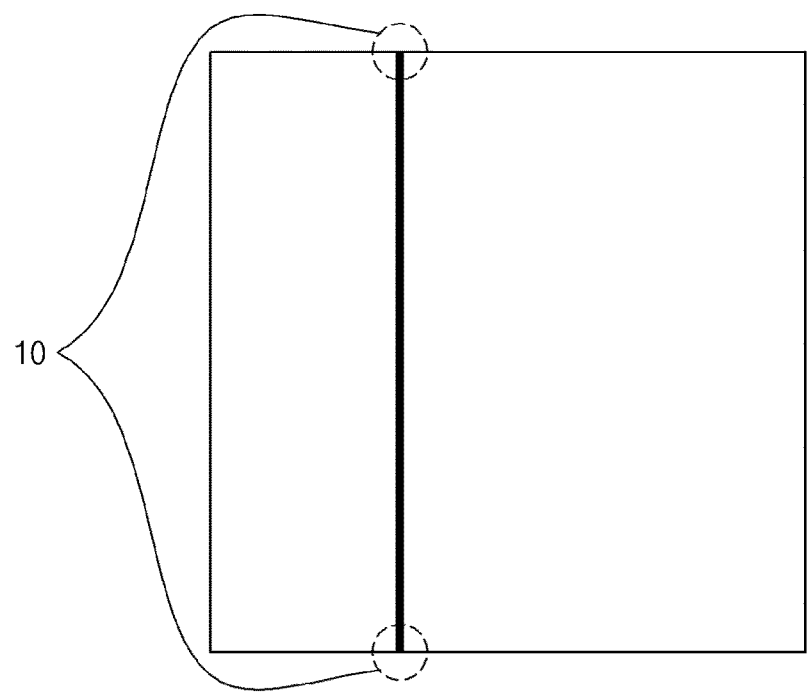

In the exemplary embodiment, a substrate for an optical device is an array of a plurality of chip substrates having a predetermined size, and being utilized by cutting thereof into each individual chip substrates. At this time, the cross-section 10 is formed to have a top view as shown in FIG. 1b, a side view as shown in FIG. 1c, and a bottom view as shown in FIG. 1d. When cutting a substrate in accordance with the above described drawings, burrs are generated during sawing or dicing, and the insulator, which is a very thin layer, will be damaged resulting in an insulation breakdown, therefore there is a problem of failure occurrence such as an electrical short.

A structure for a substrate for an optical device is proposed for solving this problem. Hereinafter, a method for manufacturing a substrate for an optical device according to an exemplary embodiment of the present invention and a substrate for an optical device manufactured by using the method will be described with reference to FIG. 2.

Figure 2:
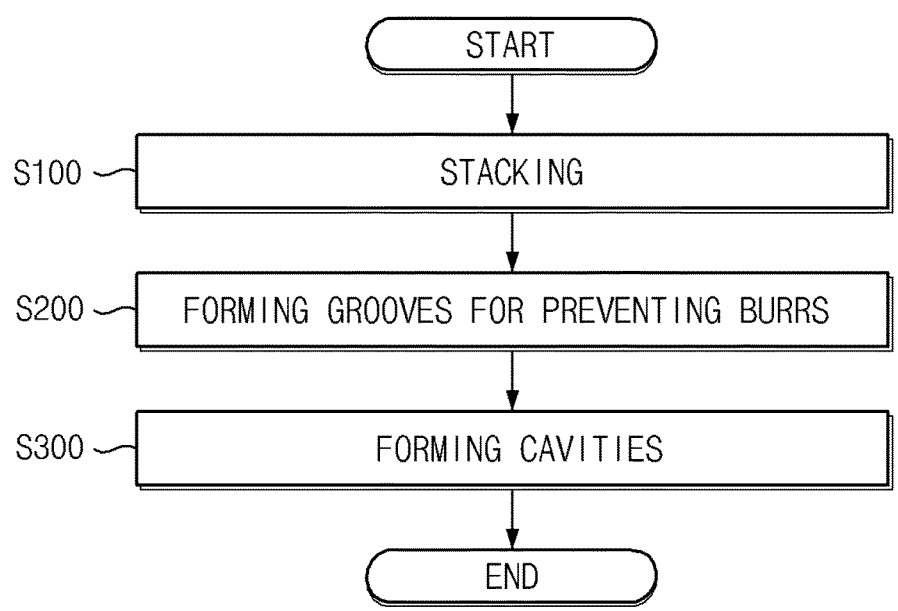
FIG. 2 is an illustration for describing the manufacturing method for a substrate for an optical device according to an exemplary embodiment of the present invention.

FIG. 2 shows a method for manufacturing a substrate for an optical device according to an exemplary embodiment of the present invention. With reference to FIG. 2, a method for manufacturing a substrate for an optical device according to the exemplary embodiment includes: a stacking step S100, a forming step S200 for a groove for preventing burrs, and a cavity forming step S300.

Figure 3A:
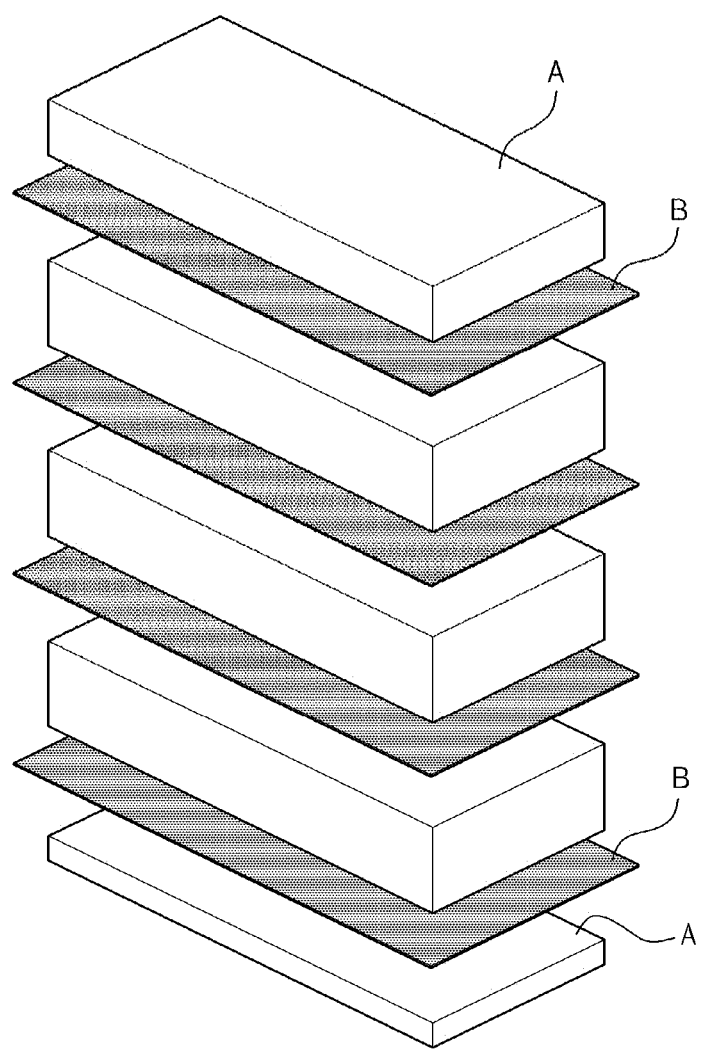
FIGS. 3a, 3b, and 3c are the drawings for describing the manufacturing process for a substrate for an optical device according to an exemplary embodiment of the present invention.

In stacking step S100, as shown in FIG. 3a, a plurality of conductive plates (or substrates) A, which are elongated along a length direction, and insulators (or insulating layers) B, which electrically insulates said conductive plates, are alternately stacked and bonded. In such a way, the conductive plates A and the insulators B are alternately stacked and followed by heating and pressurizing, thereby producing a lump of conductive material wherein the insulators B are arranged with a constant gap.

Figure 3B:
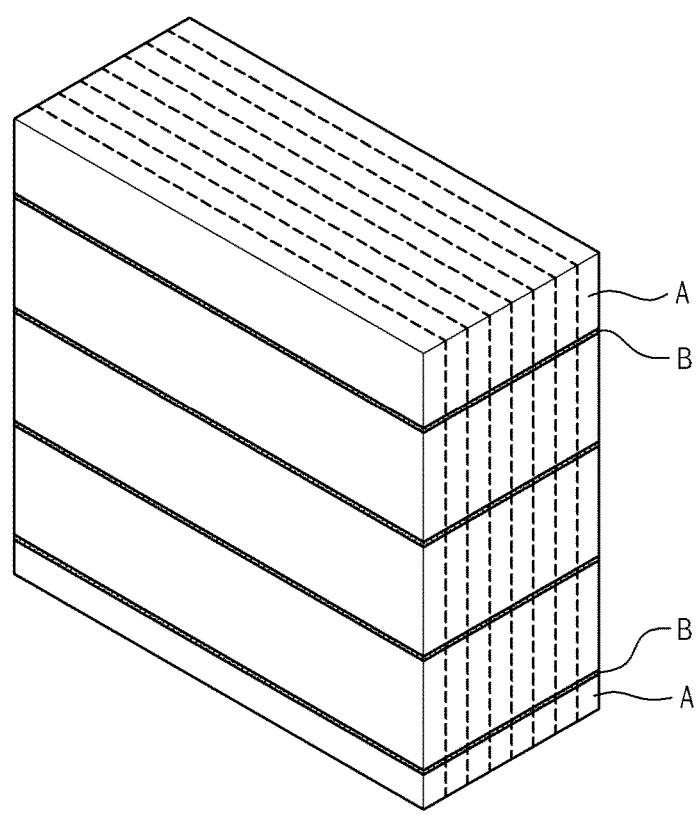
Figure 3C:
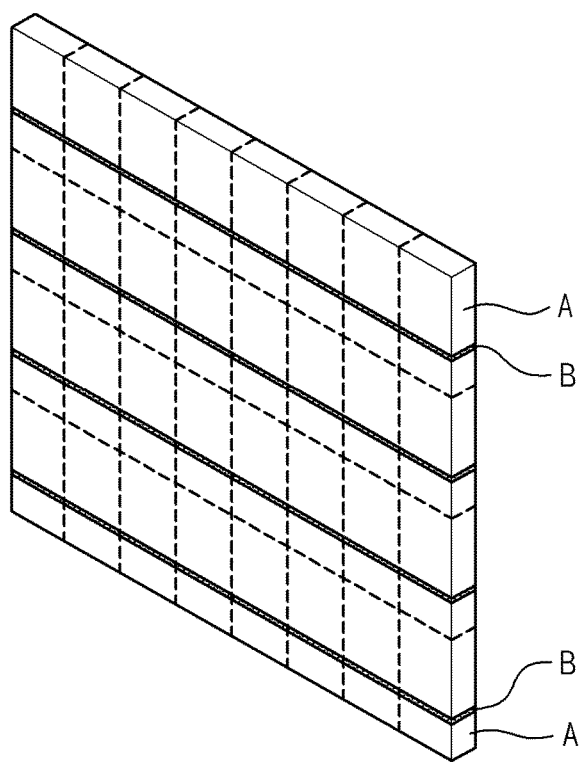

Next, by vertically cutting the lump of conductive material produced using such a way as illustrated as a dotted line in FIG. 3b, the manufacturing process of a substrate for an optical device wherein a plurality of vertical insulation films B are arranged in parallel with a gap is completed as illustrated in FIG. 3c. In the exemplary embodiment of the present invention, although a substrate for an optical device is manufactured by alternately stacking the conductive plates A and the insulation films B as illustrated in FIG. 3c, the manufacturing method is not limited thereto, and a substrate for an optical device may also be manufactured as illustrated in FIG. 3c. For example, the side surfaces of a plurality of conductive plates A, which are elongated along the length direction, are bonded with each other, wherein insulators B are formed on each bonding surface, thereby obtaining a substrate for an optical device as illustrated in FIG. 3c.

For reference, the dotted line in FIG. 3c illustrates a cutting line for obtaining each individual chip substrates. If a substrate for an optical device is cut along the cutting line which crosses over the insulator B, since the width of the insulator is very thin, the possibility of electrical short in the neighboring conductive plate A, which is being separated by the insulator B, increases due to the burrs generated during cutting. This problem can be eliminated by forming a groove for preventing burrs as described hereinafter.

Hereinafter, a forming step S200 for a groove for preventing burrs in a substrate for an optical device produced in the stacking step will be described with reference to FIGS. 4a to 6.

Figure 4A:
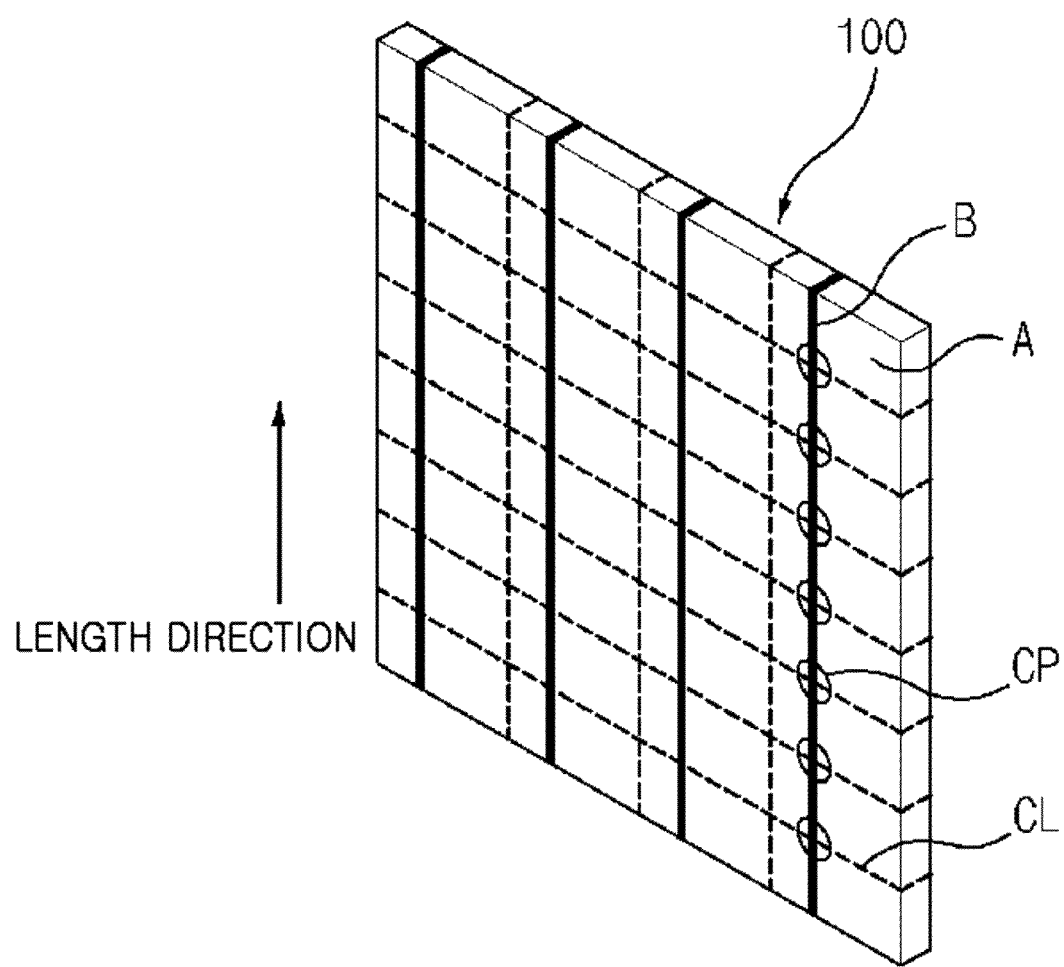

First, in a forming step S200 for a groove for preventing burrs, the side surfaces of a plurality of conductive plates A, which are elongated along the length direction thereof, are bonded with each other as illustrated in FIG. 4a, wherein when a substrate for an optical device 100, wherein the insulation film B is formed on each bonding surface, is being cut in a length direction and in a vertical direction perpendicular to the length direction, a groove 110 having a predetermined depth for preventing burrs is formed in the lower surface of the substrate at each point CP where the cutting line CL and said insulators B are being crossed as shown in FIG. 4b, and said groove 110 is formed in such a way that said insulator B is being exposed inside of each said groove 110 for preventing burrs.

That is, the optical device substrate includes the conductive plates A elongated along a length direction, wherein the side surfaces of the conductive plates A are bonded to each other with insulators B interposed therebetween, and the insulators A are respectively formed on the side surfaces of the conductive plates A. Further, a groove 110 having a predetermined depth for preventing burrs is formed in a lower surface of the optical device substrate at each point where a cutting line CL is crossed with the insulator B when the optical device substrate is cut in a length direction and in a vertical direction. The groove 110 is formed in such a way that the insulator B is exposed to the inside of the groove 110.

Figure 6:
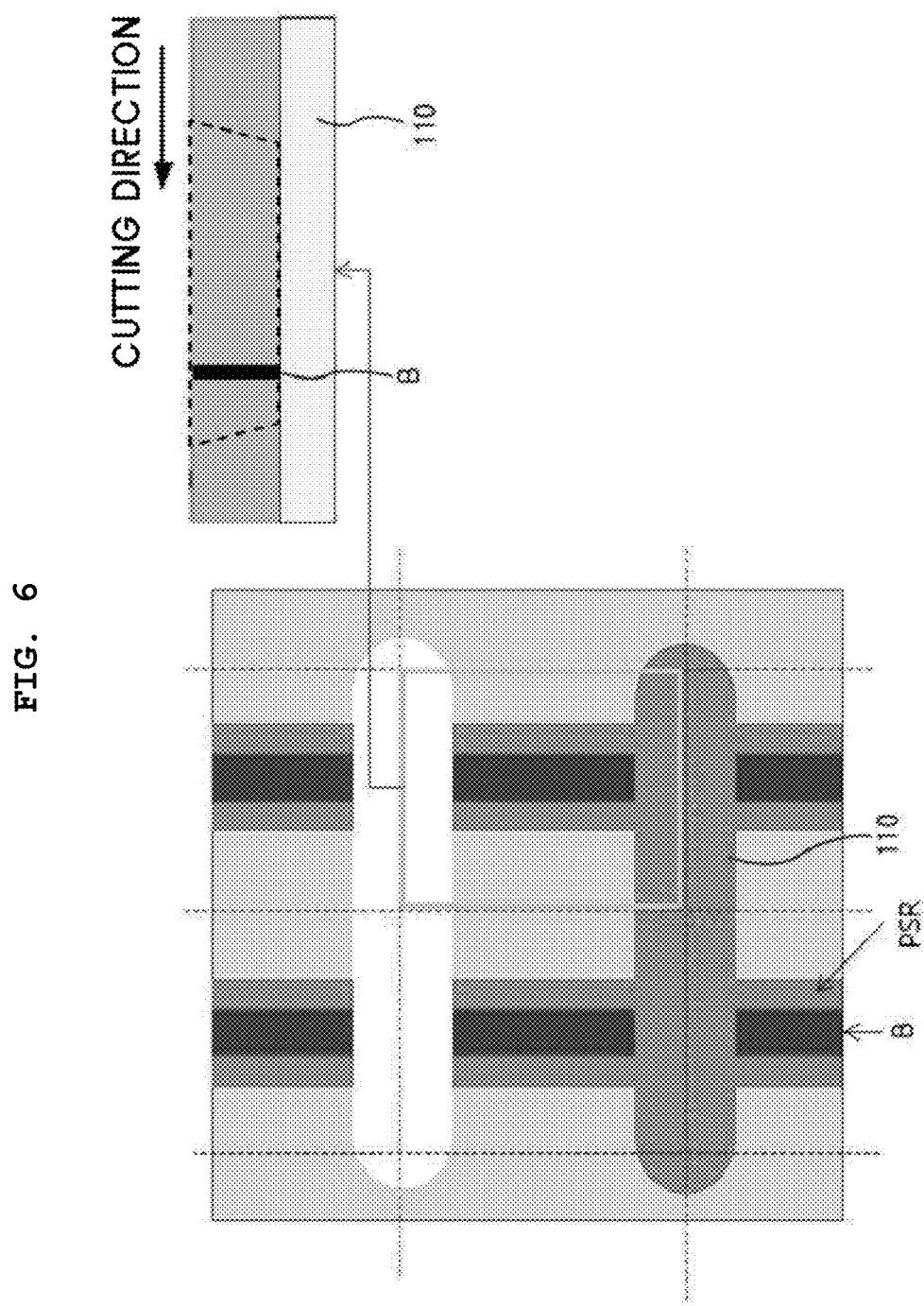

Preferably, the diameter of the groove (fit) 110 is larger than the width of the insulator B as shown in FIGS. 4b and 6, and the groove 110 for preventing burrs should be formed such that at least a part of said insulator B exposed on the lower surface of said substrate 100 is accommodated inside said groove 110 for preventing burrs as illustrated in the side view (cross-sectional view) of FIG. 5.

Inside of such groove 110 for preventing burrs a liquid insulating material 130 is deposited and cured as illustrated in FIG. 5, or a photosensitive solder resist (PSR) is additionally deposited as shown in the bottom view at the left side of FIG. 5, thereby significantly reducing the possibility of an electrical short caused by burrs.

In such a way, for a substrate for an optical device 100 with an insulator B formed therein, when a groove 110 having a predetermined depth for preventing burrs in the lower surface of the substrate at each point CP, wherein the cutting line CL and said insulators B are being crossed, is formed as shown in FIG. 6; even though burrs are generated during the cutting process of said substrate for an optical device 100, the penetration of burrs into the neighboring conductive region (plate) is blocked by said groove 110 for preventing burrs; thus, it is effective in basically eliminating the possibility of an electrical short. Further, the effect can be doubled when the inside of the groove 110 for preventing burrs are deposited with an insulating material 130. In addition, when a liquid insulating material 130 is filled into the groove 110, a photosensitive solder resist (PSR) may be deposited on a larger area than the diameter of said groove 110 as illustrated in FIG. 5 in order to prevent a failure regarding the accuracy, and a groove 110 may also be formed in an extended shape starting from one end to the other end of the substrate as illustrated in FIG. 6 such that a plurality of insulators formed in a length direction are being crossed by the groove.

Figure 7:
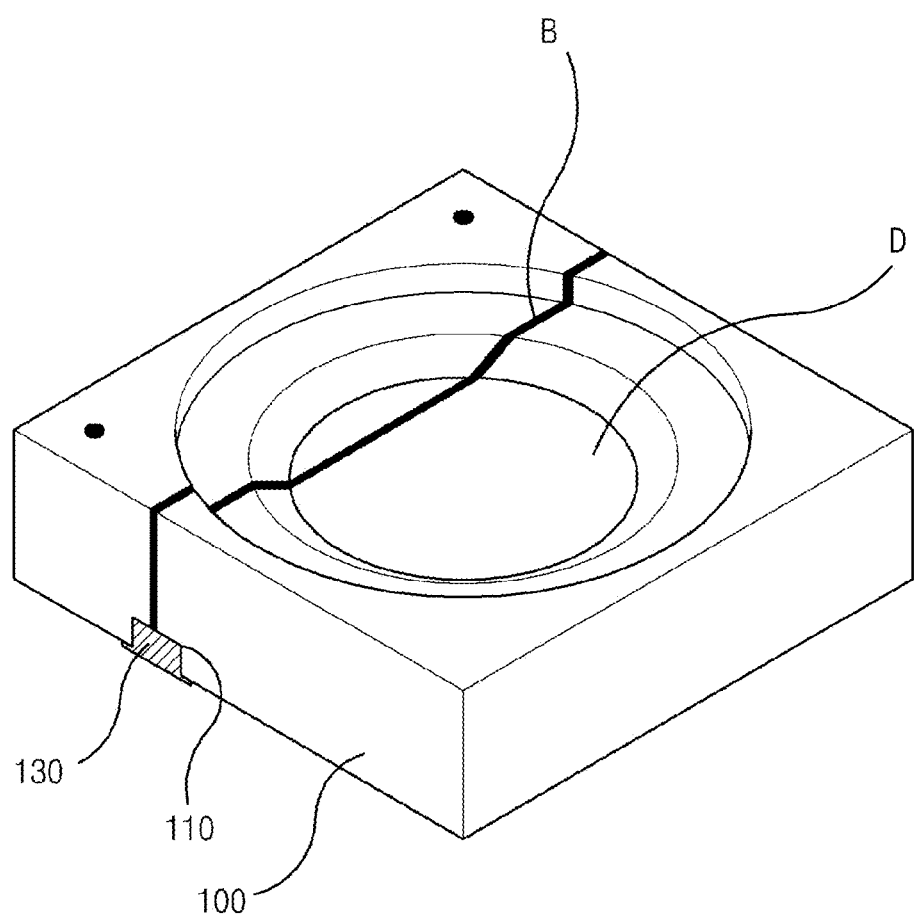
FIG. 7 is a perspective view of a chip substrate when a substrate of an optical device is being cut according to an exemplary embodiment of the present invention.

Meanwhile, a cavity D, downwardly reaching to a predetermined depth from the upper surface of the substrate as illustrated in FIG. 7, may additionally be formed (in step S300) as necessary after the groove 110 for preventing burrs is formed as described above. Depending upon manufacturing process, said groove 110 and the cavity D may be formed simultaneously, or the groove 110 maybe formed after the cavity D is formed. The cavity is formed in a way that the insulator B is exposed at the bottom surface of the cavity D, and has a downwardly narrowing taper.

For reference, in a forming step S200 for a groove 110 for preventing burrs, a groove 110 may be formed on the upper surface and the lower surface of the optical device wherein solder resist has been deposited. The reason why solder resist, preferably, white solder resist, is being deposited in such a way on the upper surface and the lower surface of the optical device substrate 100 prior to formation of the groove 110, is for enhancing optical reflection capability.

As described above, a chip substrate after cutting the substrate for an optical device wherein a groove 110 for preventing burrs and a cavity D is formed, is shown in FIG. 7.

FIG. 7 is a perspective view of a chip substrate being cut from a substrate for an optical device according to an exemplary embodiment of the present invention.

With reference to FIG. 7, a chip substrate according to an exemplary embodiment of the present invention includes: a conductive plate corresponding to a substrate (for an optical device) 100, an insulator B for insulating the conductive plate, a groove 110 for preventing burrs and a liquid insulating material 130, a photosensitive solder resist (PSR), and a cavity D. In such a chip substrate, an optical device chip is mounted inside the cavity D. Once plating is completed, an optical chip is mounted inside the cavity D, then wire bonding is performed for connecting the chip to any one of the conductive plates separated by an insulator B. In this case, a remaining electrode of the optical chip is electrically connected to another conductive plate where no optical chip is bonded thereto.

In addition, under the substrate for an optical device according to an exemplary embodiment of the present invention, a resist portion, where solder resist is deposited on the exposed area of the insulator B under the substrate, is further included as illustrated in FIG. 5 in order to prevent performance degradation due to infiltration of the solder paste into the insulator when depositing solder paste for soldering the manufactured chip substrate, thereby avoiding the deposition of solder paste thereon.

The above description is merely an exemplary description. Various modifications, changes, and substitutions are possible for a person of skill in the art within the scope without deviating from the fundamental characteristics of the present invention. Therefore the scope of protection of the present invention must be interpreted according to the following claims, and it must be interpreted in such a way that all the technical spirits within the equivalent scope of the present invention are included in the scope of the rights of the present invention.

What is claimed is:

1. A substrate for an optical device comprising an optical device substrate including a plurality of conductive plates elongated along a length direction, wherein side surfaces of the conductive plates are bonded to each other with insulators interposed therebetween, the insulators being respectively formed on the side surfaces, wherein a groove having a predetermined depth for preventing burrs is formed in a lower surface of the optical device substrate at each point where a cutting line is crossed with one of the insulators when the optical device substrate is cut in a length direction and in a vertical direction, the groove being formed in such a way that said one of the insulators is exposed to an inside of the groove.

2. The substrate for an optical device according to claim 1, wherein a liquid insulation material is deposited and cured inside the groove.

3. The substrate for an optical device according to claim 2, wherein a photosensitive solder resist (PSR) is deposited on an area of the insulator exposed to the lower surface of the optical device substrate and on an area of the liquid insulating material exposed to the lower surface of the optical device substrate.

4. The substrate for an optical device according to claim 1, wherein the groove is formed such that at least a part of the insulator exposed to the lower surface of the optical device substrate is accommodated inside the groove.

5. The substrate for an optical device according to claim 1, wherein the groove has a larger diameter than a width of each insulator.

6. The substrate for an optical device according to claim 1, wherein a solder resist is deposited on an upper surface and the lower surface of the optical device substrate so as to increase an optical reflectivity.

7. The substrate for an optical device according to claim 1, wherein a cavity reaching downwardly to a predetermined depth from the upper surface of the optical device substrate is formed in the optical device substrate in such away that the insulator is exposed to a bottom surface of the cavity.

8. The substrate for an optical device according to claim 7, further comprising an optical device chip mounted on the optical device substrate at an inside of the cavity.

\* \* \* \* \*